(12) United States Patent
Zheng et al.

(10) Patent No.: US 10,990,691 B2
(45) Date of Patent: Apr. 27, 2021

(54) SECURE DEFERRED FILE DECRYPTION

(71) Applicant: ARRIS Enterprises LLC, Suwanee, GA (US)

(72) Inventors: Jinsong Zheng, San Diego, CA (US); Alexander Medvinsky, San Diego, CA (US); Tat Keung Chan, San Diego, CA (US); Ting Yao, San Diego, CA (US); Jason A. Pasion, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 173 days.

(21) Appl. No.: 16/409,152

(22) Filed: May 10, 2019

(65) Prior Publication Data

US 2019/0347435 A1    Nov. 14, 2019

Related U.S. Application Data

(60) Provisional application No. 62/670,270, filed on May 11, 2018.

(51) Int. Cl.

| | |
|---|---|
| *G06F 21/62* | (2013.01) |
| *H04L 9/08* | (2006.01) |
| *H04L 9/32* | (2006.01) |
| *G06F 21/60* | (2013.01) |
| *G06F 21/40* | (2013.01) |
| *G06F 21/46* | (2013.01) |

(52) U.S. Cl.
CPC .......... *G06F 21/6218* (2013.01); *G06F 21/40* (2013.01); *G06F 21/46* (2013.01); *G06F 21/602* (2013.01); *H04L 9/0844* (2013.01); *H04L 9/0894* (2013.01); *H04L 9/3226* (2013.01)

(58) Field of Classification Search
None
See application file for complete search history.

(56) References Cited

U.S. PATENT DOCUMENTS

| | | | | |
|---|---|---|---|---|
| 5,940,507 | A * | 8/1999 | Cane ................... | G06F 21/6245 380/277 |
| 6,738,907 | B1 * | 5/2004 | Carter ................... | H04L 9/0891 726/9 |
| 7,051,213 | B1 * | 5/2006 | Kobayashi .......... | G06F 21/6209 380/277 |
| 2002/0085715 | A1 * | 7/2002 | Ripley ................... | H04N 5/913 380/202 |
| 2003/0217275 | A1 * | 11/2003 | Bentley ................... | G06F 21/10 713/184 |
| 2006/0143250 | A1 * | 6/2006 | Peterson ................. | H03M 7/30 |
| 2009/0307495 | A1 * | 12/2009 | Matsuo ................... | H04L 9/002 713/171 |

(Continued)

FOREIGN PATENT DOCUMENTS

JP    200533480    * 2/2005

*Primary Examiner* — Piotr Poltorak
(74) *Attorney, Agent, or Firm* — Chernoff, Vilhaur, McClung & Stenzel, LLP

(57) ABSTRACT

A method is provided that permits user to submit a password to the private key that is to be used to decrypt files either at the time of user account setup or at the time of submitting the files. The password is stored securely in the system, permanently or temporarily, and is used later to decrypt the files right before the system is ready to process the files.

20 Claims, 8 Drawing Sheets

(56) References Cited

U.S. PATENT DOCUMENTS

| | | | |
|---|---|---|---|
| 2010/0250925 A1* | 9/2010 | Hiraide | G06F 21/6209 |
| | | | 713/165 |
| 2013/0024700 A1* | 1/2013 | Peterson | H04L 69/329 |
| | | | 713/189 |
| 2013/0091359 A1* | 4/2013 | Guo | H04L 63/162 |
| | | | 713/171 |
| 2014/0029747 A1* | 1/2014 | Kamieniecki | H04N 21/440218 |
| | | | 380/28 |
| 2014/0181529 A1* | 6/2014 | Joyce, III | G06F 21/31 |
| | | | 713/183 |
| 2014/0298031 A1* | 10/2014 | Huang | G06F 21/71 |
| | | | 713/176 |
| 2018/0293391 A1* | 10/2018 | Vasselli | G06F 21/6218 |

* cited by examiner

SECURE DEFERRED FILE DECRYPTION

CROSS-REFERENCE TO RELATED APPLICATIONS

This application claims benefit of U.S. Provisional Patent Application No. 62/670,270, entitled "SECURE DEFERRED FILE DECRYPTION," by Jinsong Zheng, Alexander Medvinsky, Tat Keung Chan, Ting Yao and Jason A. Pasion, filed May 11, 2018, which application is hereby incorporated by reference herein.

BACKGROUND

1. Field

The present disclosure relates to systems and methods for processing data files, and in particular to a system and method for securely deferring processing of encrypted data files.

2. Description of the Related Art

When electronic data files containing sensitive data need to be exchanged and processed among multiple parties, they are often encrypted before being transmitted from one party to another. The receiving party must decrypt them before processing them. Certain highly sensitive data typically has very strict operational security requirements limiting how the data is permitted to be processed. One of such requirements is that an encrypted file can only be decrypted by certain designated operators and only immediately before the data in the file is needed for processing. Such a file is often encrypted by the public key of an asymmetric cryptographic key pair. The private key of the key pair is used to decrypt an encrypted file and has a password known only to a number of designated operators. The password of a private key must be supplied whenever the private key is used for decryption.

A file subject to the afore-mentioned requirements poses a problem for a data processing system that allows a designated operator to submit encrypted files at any time but chooses, based on certain factors such as system load and processing priority, to process the files at a later time. The system may, at an unpredictable time, find that it is in the right condition to process the file and proceed to process it.

On one hand, at the time of file submission a designated operator is present and can provide the password to the private key but the file should not be decrypted at that time because the file is not necessarily going to be processed immediately after submission. On the other hand, when the system is about to process the file at a later and unpredictable time, no designated operator may be present to provide the password to the private key, leaving the system unable to decrypt the file for processing.

The problem to be resolved is how to make a data processing system that may defer the processing of files capable of, in a secure way, processing certain files that can only be decrypted by a designated operator who is not present at the time of file processing.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To address the requirements described above, this document discloses a system and method for deferring decryption and processing of an encrypted file. In one embodiment, a first phase of the method comprises receiving the encrypted file, the file encrypted according to a delivery public key [DPubK] of a delivery key pair, the key pair comprising the delivery public key and a delivery private key [DPrivK], a password [DPrivKP] of the delivery private key; storing the file encrypted according to the delivery public key $[File]_{DPubK}$ in persistent storage; receiving the password of the delivery private key [DPrivKP]; generating a data package comprising the password of the delivery private key [DPrivKP]; encrypting the data package according to a password protection key; and storing the encrypted data package and data processing job information [Jinfo] referencing the encrypted file $[File]_{DPubK}$ as a job record in persistent storage. A second phase includes retrieving the encrypted data package from persistent storage referenced by the job information [Jinfo]; decrypting the encrypted data package to retrieve the password associated with the delivery private key [DPrivKP]; retrieving, the delivery private key protected by the password associated with the delivery private key $[DPrivK]_{DPrivKP}$ from persistent storage; recovering the delivery private key using the password associated with the delivery private key [DPrivKP]; retrieving the file encrypted according to the delivery public key $[File]_{DPubK}$ from persistent storage; and decrypting the file encrypted according to the delivery public key $[File]_{DPubK}$ using the delivery private key. Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout:

FIG. 3 is a diagram presenting;

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

Described below is a system and method that permits a user provide the password to the private key that is to be used to decrypt files either at the time of user account setup or at the time of submitting the files. The password is stored securely in the system, permanently or temporarily, and is used later to decrypt the files right before the system is ready to process the files.

Definitions and Notation Convention

Data processing system—A computer system consisting of several functional components that allows users to submit data files to be processed.

Data processor—A functional component of a data processing system that carries out data processing tasks.

Data processor ID (DPID)—The identifier of one kind of data processor.

Delivery key pair—An asymmetric key pair used to protect data files that are delivered from one party to another.

Delivery private key (DPrivK)—The private key of a delivery key pair.

Delivery private key password (DPrivKP)—The password of the delivery private key.

Delivery public key (DPubK)—The public key of a delivery key pair.

Hash—The output of a cryptographic hash function applied to a piece of data

HSM—Hardware Security Module, a functional component of data processing system.

ID—Identifier.

Job reference ID (JRID)—The identifier of a data processing job.

Password protection key (PPK)—A symmetric key used to protect a delivery private key password.

Password protection key pair—An asymmetric key pair used to protect a delivery private key password.

Password protection private key (PPPrivK)—The private key of a password protection key pair.

Password protection public key (PPPubK)—The public key of a password protection key pair.

Persistent storage—A functional component of a data processing system for the storage of data that can persist without electrical power.

System manager—A functional component of a data processing system that its users use to submit files for processing.

User account password (UAP)—The password of a user's user account of a data processing system.

$[X]_K$—Data X encrypted by key K, or key X protected by password K.

Figure 1:
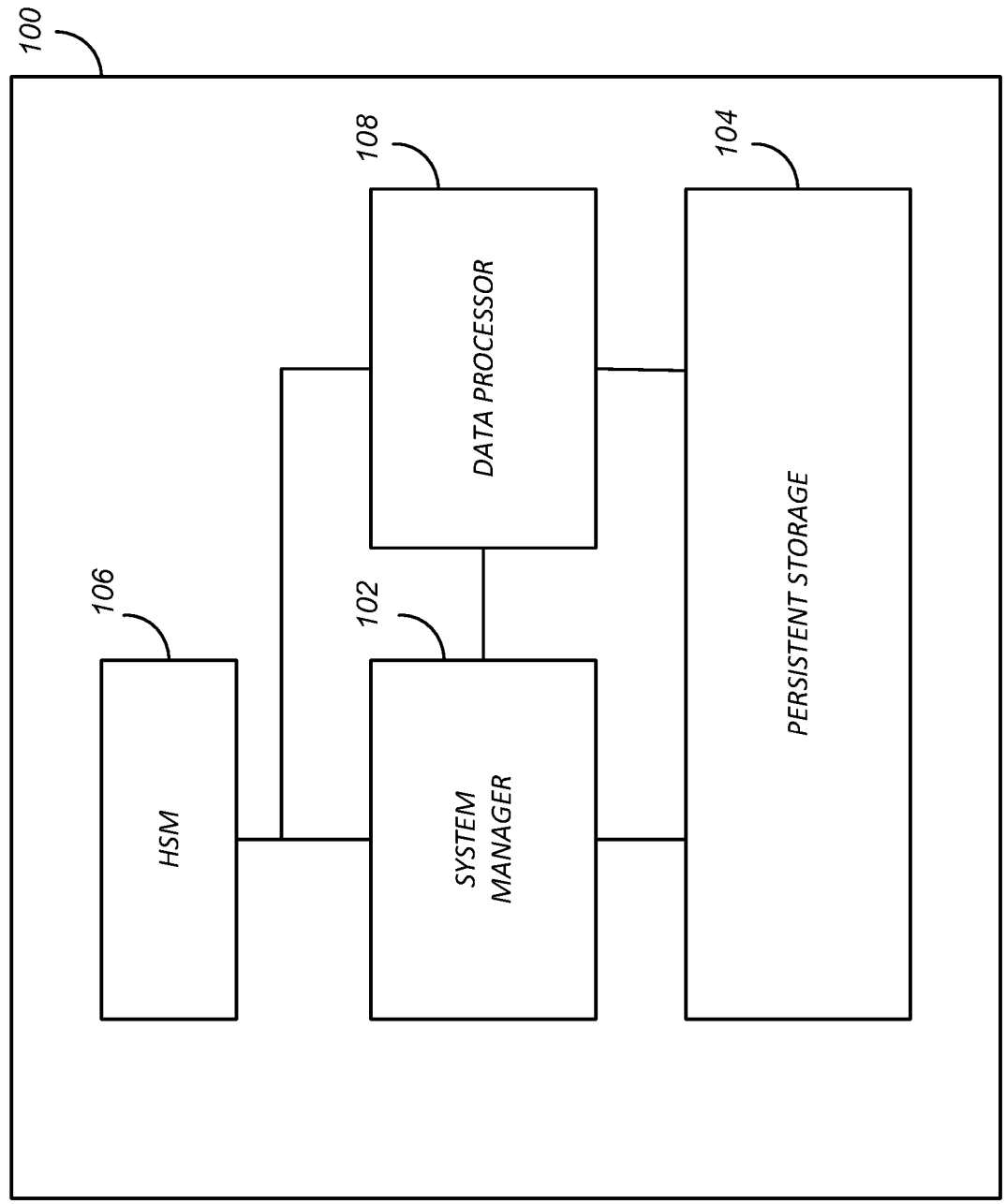
FIG. 1 is a diagram of a data processing system.
Figure 1:
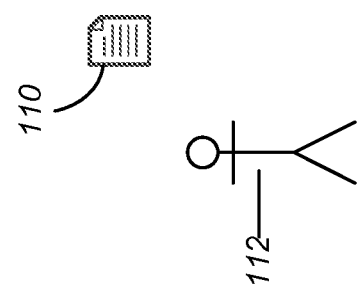

FIG. 1 is a diagram of a data processing system 100. The data processing system uses highly sensitive cryptographic keys to secure data, and comprises one or more system managers 102, which provide an interface for human users 112 to interact with the data processing system 100. The data processing system 100 may also comprise one or more hardware security modules (HSMs) 106 that store sensitive cryptographic key materials and perform certain cryptographic operations. HSMs 106 are typically "black box" devices in that they accept inputs and provide outputs based on the inputs, but the how such outputs are obtained (e.g. which combination of processing operations) is invisible. The data processing system also comprises one or more data processors 108 communicatively coupled to the system manager 102 that generate new data from input data files 110. The data processing system 100 also comprises one or more persistent storage devices 104 communicatively coupled to the system manager(s) and/or data processor(s) 108 for storing files, data and metadata, such as a database or file system.

In a particular implementation of a data processing system 100, some of the above functional components may be combined into one module or split into several modules, and each component may have multiple instances. There may also be multiple kinds of data processor 108, each specializing in processing one or more specific types of data.

DPrivK as protected by DPrivKP ($[DPrivK]_{DPrivKP}$) is stored in a persistent storage that is accessible to system managers and data processors. The corresponding DPubK is distributed to other parties that have secure data to deliver to the data processing system to process. The same DPubK is also stored in a persistent storage in the data processing system itself, and is used in part of the verification as described in more details below.

Embodiments

The secure data processing system 100 and method can be practiced in multiple implementations. One implementation option concerns whether the Delivery Private Key Password (DprivKP) is permanently stored in persistent storage 104 or not. Another implementation option concerns the key used to protect the data package that comprises the delivery private key password. In one implementation, the data package is protected with an asymmetric key pair, while in another implementation, a symmetric key is used. Other implementation options include whether the key used to protect the data package is common to all data processors in the system 100, or is different for each data processor or group of data processors. These implementation options are distinct in that any combination of these options may be used. Each such implementation option is further summarized below.

Permanently Stored Delivery Private Key Password (DPrivKP)

One implementation of a data processing system 100 may have DPrivKP 402 permanently stored in a persistent storage 104. In such a system 100, the delivery private key password may be encrypted with each operator's UAP and the encrypted DPrivKP, $[DPrivKP]_{UAP}$ stored with the user account of the operator 112. Every time an operator's UAP changes, the system 100 decrypts DPrivKP using the operator's 112 old UAP, re-encrypts DPrivKP using the operator's new UAP, and stores the newly encrypted DPrivKP with the operator's user account in persistent storage 104.

Data Package Protected with Symmetric Key

In another implementation, the data package is protected with a symmetric password protection key PPK, which may be stored in a hardware security module HSM 106.

Data Package Protected with Asymmetric Key Pair

In one implementation, the data package is protected with the public key of an asymmetric key pair associated with the target data processor (PPPubK)

Common or Separate Password Protection Key/Key Pair

In a data processing system 100 that has multiple of data processor 108 types (for example, different data processors 108 being used to process different data types, data from different sources, or to perform different operations), there may be one password protection key for all of data processor 108 types, or different password protection keys for each different data processor 108 type. Having different password protection keys for different data processor 108 type can prevent DPrivKP intended for one data processor 108 from being used by another data processor 108 type. Similarly, data processors 108 may be distinguished by their unique identity rather than type, in which case, different password protection keys may be used for different data processors 108, even if they are of the same type. This allows the processing of data to occur only on the appropriate data processor 108.

The system manager 102 that accepts a particular type of data file 100 has the information as to which password protection key is used by the type of or a specific instance of data processor 108 for the type of data file 110. All password protection keys are stored in one or more HSMs 106.

In embodiments using a password protection key pair and multiple data processor 108 types, there may be one password protection key pair for all of data processor 108 types, or different password protection key pairs for different data processor 108 types. Having different password protection key pairs for different data processor 108 types can prevent DPrivKP intended for one type of data processor from being used by another type of data processor. Here, the system manager 102 that accepts a particular type of data file 100 has the information as to which password protection key pair is used by the kind of data processor 108 for the type of data file 110, and holds the password protection public key (PPPubK). All password protection private keys are stored in one or more HSMs 106.

Figure 2:
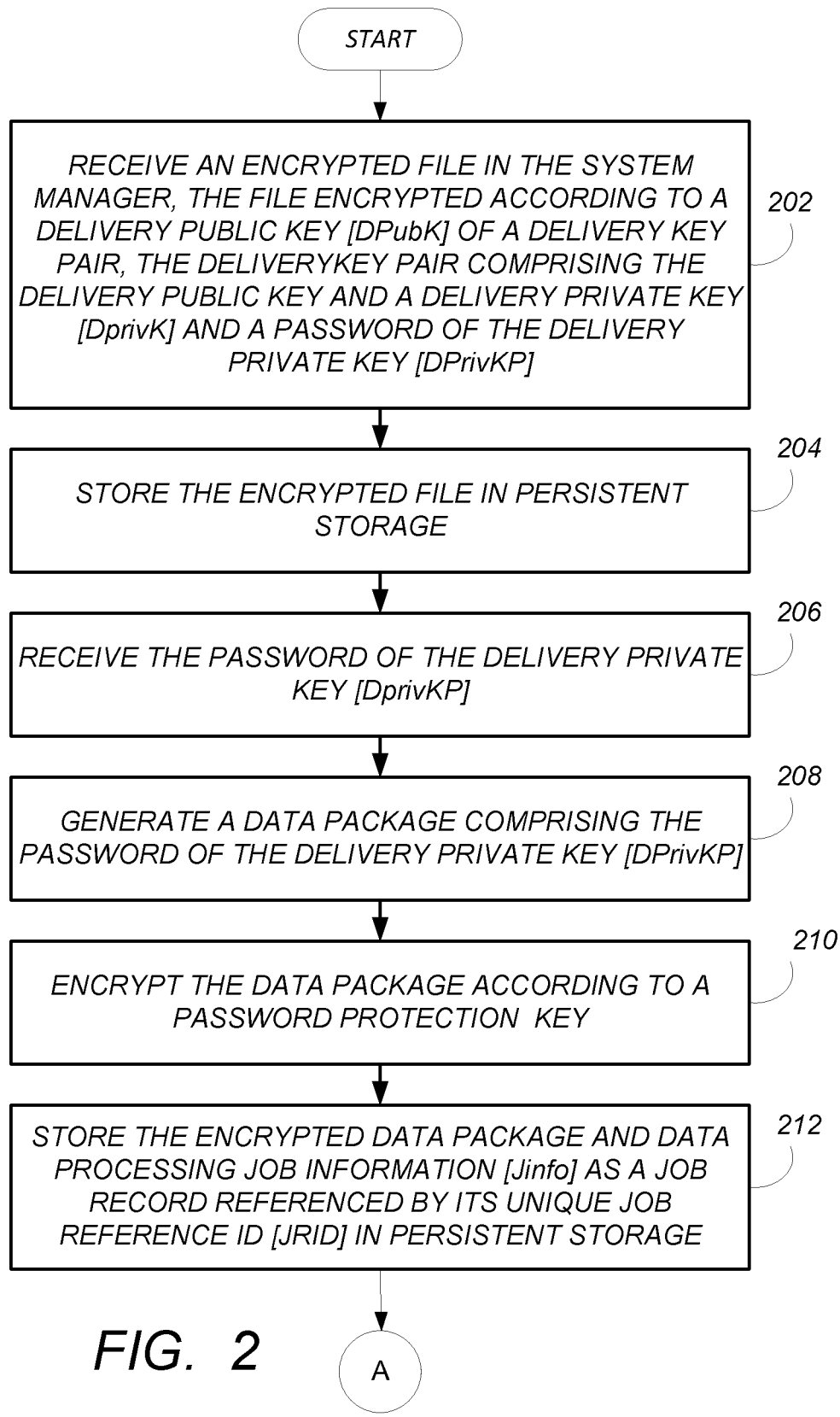
FIGS. 2 and 3 are diagrams depicting one embodiment of an exemplary deferred file decryption process.
Figure 3:
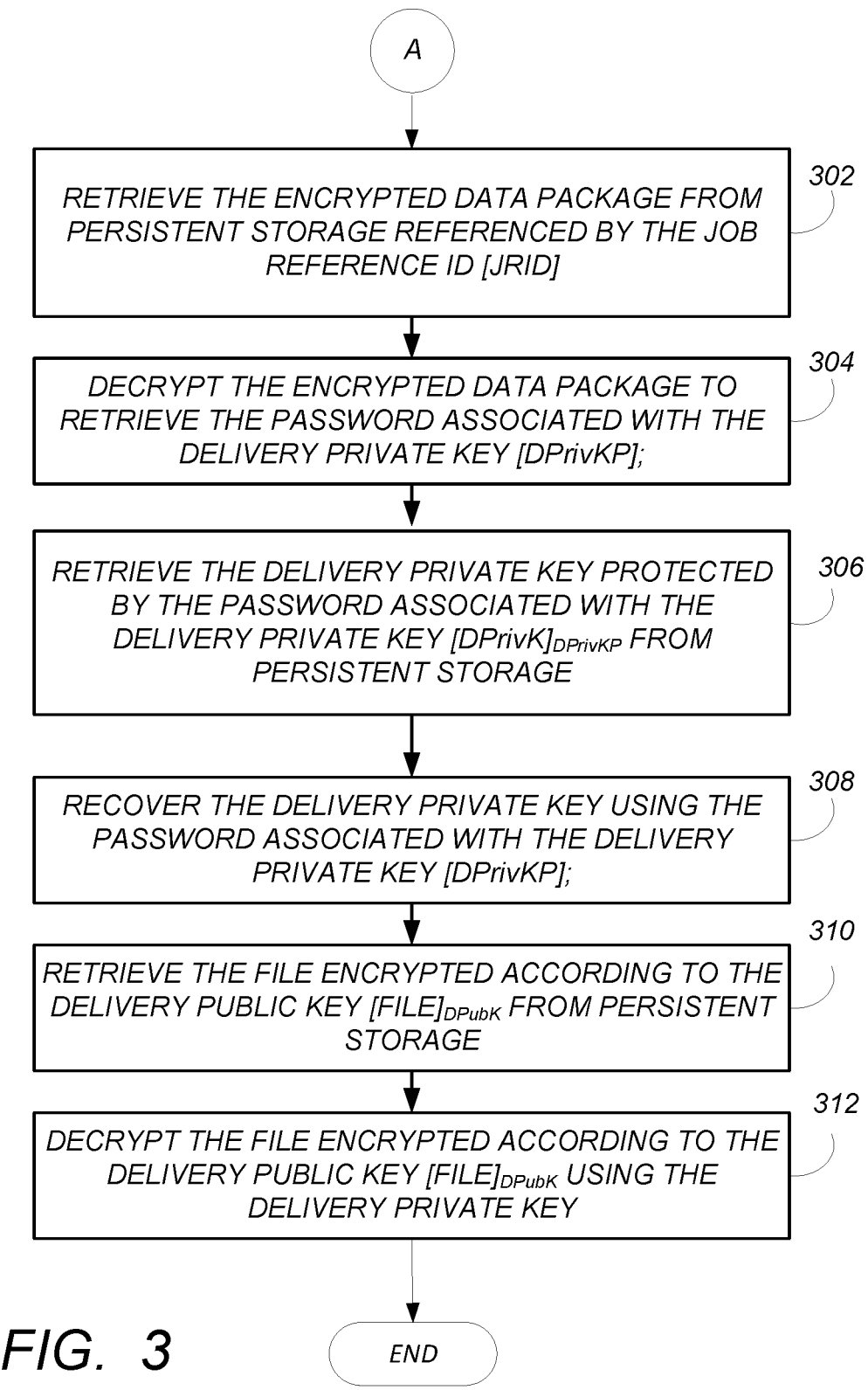

FIGS. 2 and 3 are diagrams depicting one embodiment of an exemplary deferred file decryption process. FIG. 2 is a diagram depicting one embodiment of a first stage of the deferred file decryption process. This first stage is referred to as the file submission stage, where the encrypted file is submitted to be stored in persistent storage 104 for later use. FIG. 3 is a diagram depicting one embodiment of a second stage of the process, in which the encrypted file is decrypted and processed.

Referring first to FIG. 2, an encrypted file is received in the system manager. The encrypted file is encrypted according to a delivery public key [DPubK] of a delivery key pair that includes the delivery public key [DPubK], a delivery private key [DPrivK] and a password of the delivery private key (hereinafter alternatively referred to the delivery private key password) [DPrivKP]. This is illustrated in block 202. In block 204, the received encrypted file 110 is stored in persistent storage 104.

In block 206, a password of the delivery private key [DPrivKP] is received.

In one embodiment in which the delivery private key password [DPrivKP] may be stored in persistent storage 104 (albeit in encrypted form), the delivery private key password [DPrivKP] is encrypted according to a user account password [UAP] and ($[DPrivKP]_{UAP}$) stored in persistent storage 104 as a part of an account of the user and separate from the account of other users. In this embodiment, the password of the received delivery private key [DPrivKP] is retrieved by receiving the user account password [UAK] from the user 112, retrieving the encrypted password of the delivery private key ($[DPrivKP]_{UAP}$ from persistent storage 104, then decrypting the encrypted password of the delivery private key ($[DPrivKP]_{UAP}$) according to the user account password [UAP].

In another embodiment in which the delivery private key password [DPrivKP] may not be stored in persistent storage 104, the user 112 provides the delivery private key password to the system manager 102 directly when required.

The password of the delivery private key [DPrivKP] may optionally be verified after receipt to assure its validity. This can be accomplished by generating random data [RD], encrypting the random data [RD] according to the delivery public key [DPubK], then decrypting the encrypted random data [RD] according to the delivery private key [DPrivK] to produce derived random data [RD']. If the password of the delivery private key [DPrivKP] is correct, the derive random data [RD'] should be equal to the random data [RD] initially generated. Hence, the password of the delivery private key [DPrivKP] is verified only if the initial random data [RD] and the derived random data [RD'] are equal. If the password of the delivery private key [DPrivKP] cannot be verified, processing terminates, and the user 112 is notified. If the password of the delivery private key [DPrivKP] is verified, processing continues.

In block 208, the system manager 102 generates a data package that comprises the password of the delivery private key [DPrivKP]. In one embodiment, the generated data package includes a system 100 wide unique job reference or job reference identifier [JRID], an identifier of the data processor 108 for that will process the file, and an expiration time stamp [Exp].

In block 210, the data package is encrypted according to a password protection key. In one embodiment, this comprises encrypting the data package according to a password protection public key [PPPubK] of the data processor, and deleting the clear password from the internal working memory of the system manager. In another embodiment, the password protection key is a symmetric password protection key [PPK] that is securely stored in the hardware security module [HSM] 106.

The encrypted data package and data processing job information [Jinfo] is then stored in persistent storage 104, for example, as a job record, as shown in block 212. The stored job record may also include the system-wide unique job reference [JRID].

FIG. 3 is a diagram depicting one embodiment of a second stage of the process, in which the encrypted file is decrypted and processed. As described above, these operations are performed at a time typically well subsequent to the operations of FIG. 2. In block 302, the encrypted data package is retrieved by the data processor 108 from persistent storage 104 as part of a job record along with the processing job information [Jinfo]. This is accomplished using the job reference [JRID].

The encrypted data package is decrypted to recover the password associated with the delivery private key [DPrivKP], as shown in block 304. In embodiments in which the data package was encrypted with the password protection public key [PPPubK] of the data processor, the encrypted data package is decrypted in the hardware security module [HSM] using a password protection private key [PPPrivK] securely stored in the hardware security module [HSM]. In embodiments in which the data package was encrypted with the password protection key [PPK] in the hardware security module [HSM], the encrypted data package is decrypted in the hardware security module [HSM] using the password protection key [PPK] security stored in the hardware security module [HSM]. In either case, the result is a decrypted version of the encrypted data package.

Following decryption of the encrypted data package, the password associated with the delivery private key [DPrivKP] is available in plaintext.

In one embodiment the encrypted data package includes not only the password associated with the delivery private key [DPrivKP], but also an identifier [DPID] of the data processor 108 for which the file 110 was stored. Further, the stored job record further comprises the system-side unique job reference identifier [JRID] and an expiration time stamp [Exp]. In this embodiment, a test is made to determine if the retrieved (e.g. decrypted and parsed) system-wide unique job reference identifier [JRID] matches the system-wide unique job reference identifier [JRID] of the job record. If the job reference identifiers [JRID] do not match, processing is terminated and a message may be sent to the user 112 indicating as such. Further, the expiration time stamp [Exp] can be compared to the current time and if the current time exceeds the time stamp, processing may also be terminated. Still further, if the data processor identifier [DPID] of the decrypted data package does not match the data processor identifier [DPID] of the data processor 108 requesting the data package, processing may be terminated.

In block 310, the file 110, which was encrypted according to the delivery public key [File]$_{DPubK}$, is retrieved from persistent storage 104. Further, in block 312, the encrypted data file is decrypted using the delivery private key [DPrivK] and its password [DPrivKP] from the decrypted data package.

Figure 4:
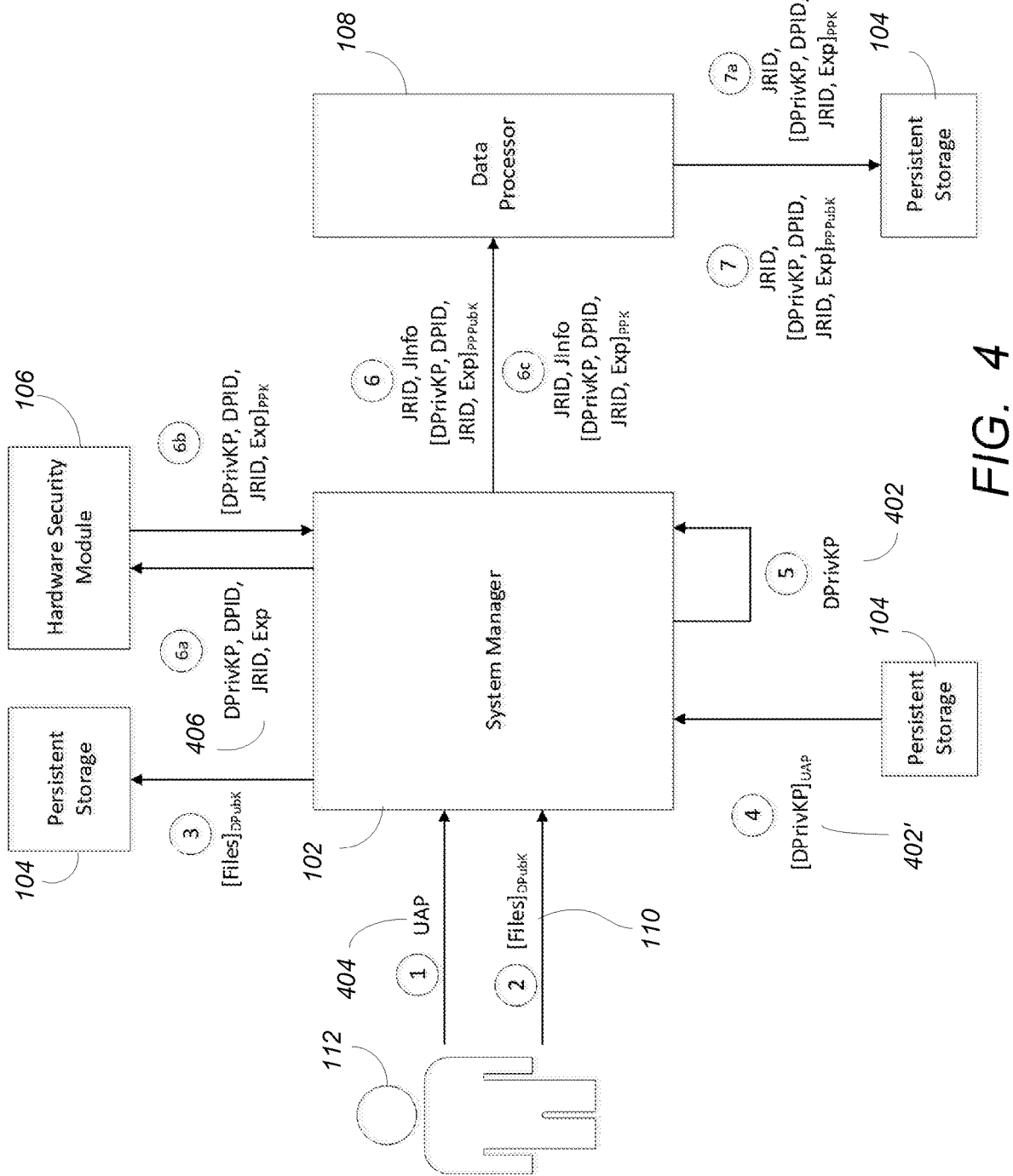
FIG. 4 is a diagram illustrating further details regarding the file submission stage of the secure deferred file decryption with a permanently stored delivery private key password.
Figure 5:
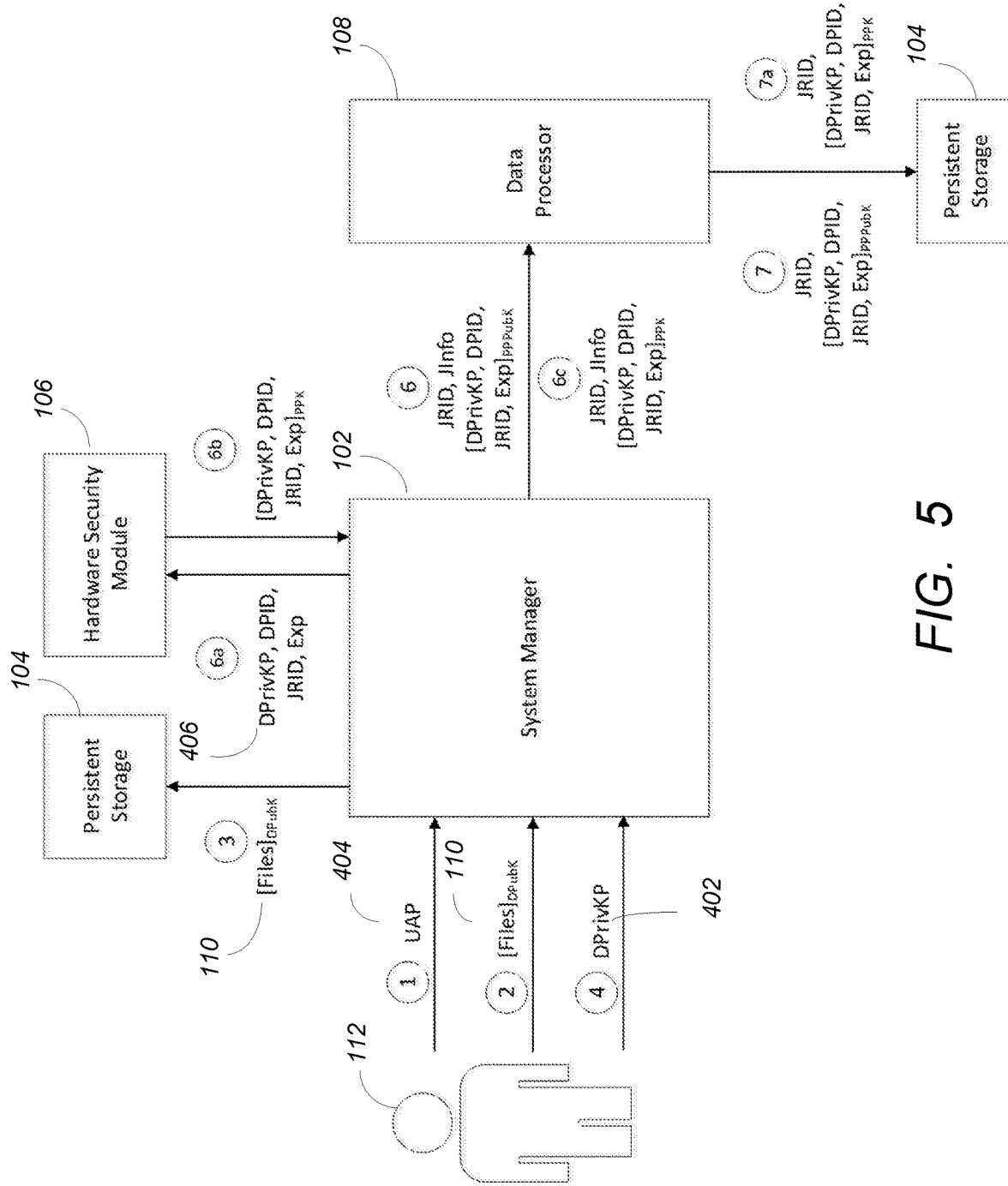
FIG. 5 is a diagram illustrating the file submission stage of the secure deferred file decryption without permanently stored delivery private key password.
Figure 6:
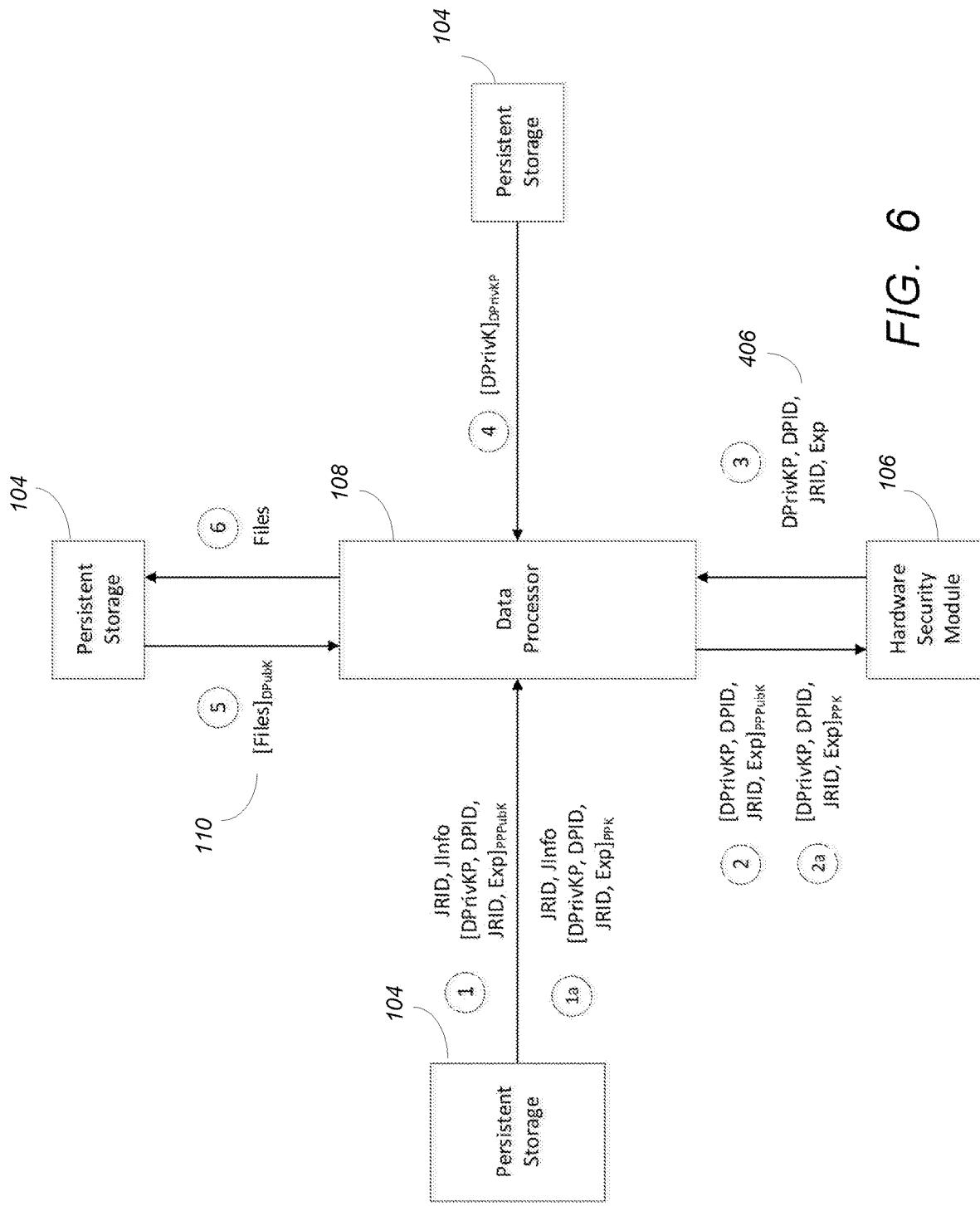
FIG. 6 is a diagram illustrating the file decryption stage of the secure deferred file decryption process.

FIGS. 4-6 are diagrams illustrating the secure deferred file decryption process in greater detail.

File Submission Stage with [DPrivKP]$_{UAP}$

FIG. 4 is a diagram illustrating further details regarding the file submission stage of the secure deferred file decryption with a permanently stored [DPrivKP]$_{UAP}$. The file submission stage of the process with [DPrivKP]$_{UAP}$ starts when, in step 1 (such steps are illustrated with an enclosed circle), an operator or user 112 logs into the system 100 through the system manager 102 using the operator's UAP, which is supplied to and held by the system manager 102. In step 2, the user 112 submits a set of files 110 of the same data type encrypted by DPubK ([Files]$_{DPubK}$) to the system manager 120. In step 3, the system manager 102 stores the encrypted files in a persistent storage 104.

In step 4, the system manager 102 retrieves [DPrivKP]$_{UAP}$ stored with the operator's user account from persistent storage 104 where user accounts are stored. In step 5, the system manager 102 decrypts DPrivKP using the operator's UAP 404 it holds and performs a verification. The verification includes the sequential operations of (1) generating a piece of random data, RD, (2) encrypting the random data using DPubK, producing [RD]$_{DPubK}$, (3) Decrypting [RD]$_{DPubK}$ using DPrivK and DPrivKP, producing RD', and (4) checking to determine if RD' is identical to RD.

If the verification succeeds and if a password protection key pair is used to protect DPrivKP, in step 6, the system manager 102 generates a system-wide unique job reference ID (JRID) and an expiration time stamp (Exp), and puts them in a data package 406 along with DPrivKP and ID of the target data processor 108 for the type of data files submitted in step 2 (DPID). The system manager 102 then encrypts the entire data package 406 using PPPubK for the target data processor 108, scrubs the clear DPrivKP from its memory, and sends the encrypted data package ([DPrivKP, DPID, JRID, Exp]$_{PPPubK}$) along with the clear JRID, and other information for the data processing job (Jinfo) to the target data processor 108. The target data processor's DPID and JRID are packaged with DPrivKP so that the target data processor 108 can verify that this copy of DPrivKP is intended for use only by it for the specific data processing job. The expiration time stamp allows the target data processor 108 to decline to use DPrivKP after the expiration time.

Alternatively, if the verification succeeds and if a PPK is used to protect DPrivKP, instead of step 6, steps 6a, 6b and 6c are carried out. In step 6a, the system manager 102 generates a system-wide unique job reference ID (JRID) and an expiration time stamp (Exp), and puts them in a data package 406 along with DPrivKP and ID of the target data processor for the type of data files submitted in step 2 (DPID). The system manager 102 then asks the HSM 106 that holds the PPK for the target data processor 108 to encrypt the entire data package 406 using the PPK. In step 6b, the system manager 102 gets the encrypted data package ([DPrivKP, DPID, JRID, Exp]$_{PPK}$) back from the HSM 106. In step 6c, the system manager 102 sends [DPrivKP, DPID, JRID, Exp]$_{PPK}$ to the target data processor 108, along with the clear JRID and other information for the data processing job (Jinfo).

If a password protection key pair is used to protect DPrivKP, in step 7, the target data processor 108 saves JRID, JInfo, and [DPrivKP, DPID, JRID, Exp]$_{PPPubK}$ as a job record in a persistent storage 104 where data processing jobs are stored.

Alternatively, if a PPK is used to protect DPrivKP, in step 7a, the target data processor 108 saves JRID, JInfo, and [DPrivKP, DPID, JRID, Exp]$_{PPK}$ as a job record in a persistent storage where data processing jobs are stored.

At the end of the file submission stage, the files 110 that contain sensitive data are still encrypted and the operator 112 can log out of the system 100. The files 110 will be processed at a later time by the target data processor 108 without any operator's involvement.

File Submission Stage without [DPrivKP]$_{UAP}$

In some data processing systems 100, the holding of clear UAP for an extended period of time in the memory of any component of the system 100 may not be allowed after the user 112 is authenticated, nor the holding of clear DPrivKP in memory of any component for an extended period of time for any purpose other than its input, encryption, re-encryption and use. In such a system, DPrivKP cannot be encrypted by UAP and stored permanently for later use because it would require the holding of either clear UAP or clear DPrivKP for an extended period of time during the file submission stage.

FIG. 5 is a diagram illustrating the file submission stage of the secure deferred file decryption without permanently stored [DPrivKP]$_{UAP}$. Without an encrypted and permanently stored DPrivKP, DPrivKP is instead supplied by a user 112 at the time of submitting data files 110. In step 1, the operator 112 logs into the system through a system manager 102 using the operator's UAP. The system manager 102 scrubs the clear UAP from its memory immediately after user authentication. steps 2 and 3 of the file submission stage without [DPrivKP]$_{UAP}$ are the same as steps 2 and 3, respectively, of the file submission stage with [DPrivKP]$_{UAP}$.

In step 4, the operator 112 enters DPrivKP to the system manager, which performs the same verification as in step 5 of the file submission stage with [DPrivKP]$_{UAP}$. If the verification succeeds and if a password protection key pair is used to protect DPrivKP, the remaining steps 6 and 7 are the same as steps 6 and 7, respectively, of the file submission stage with [DPrivKP]$_{UAP}$.

Alternatively, if the verification succeeds and if a PPK is used to protect DPrivKP, the remaining steps 6a, 6b, 6c and 7a are the same as steps 6a, 6b, 6c and 7a, respectively, of the file submission stage with [DPrivKP]$_{UAP}$.

File Decryption Stage

After a data processing job is stored by a data process, at a later time, the data process may decide to do the job. Before the actual data processing can happen, the data files 110 of the job must be decrypted.

FIG. 6 is a diagram illustrating the file decryption stage of the secure deferred file decryption process. In cases where a password protection key pair is used to protect DPrivKP, in step 1, the file decryption stage starts when a data processor 108 retrieves job record of the job it decides to do, including JRID, JInfo, and the encrypted data package [DPrivKP, DPID, JRID, EXp]$_{PPPubK}$. Alternatively, if a PPK is used to protect DPrivKP, in step 1a, the file decryption stage starts when a data processor 108 retrieves job record of the job it decides to do, including JRID, JInfo, and the encrypted data package [DPrivKP, DPID, JRID, EXp]$_{PPk}$.

If a password protection key pair is used to protect DPrivKP, in step 2, the data processor 108 asks the HSM 106 that holds its PPPrivK to decrypt the data package using the PPPrivK in the HSM 106. Alternatively, if a PPK is used to protect DPrivKP, in step 2a, the data processor 108 asks the HSM 106 that holds its PPK to decrypt the data package using the PPK in the HSM 106.

In step 3, the data processor 108 gets the clear data package containing DPrivKP, JRID, DPID and Exp back from the HSM 106. The data processor 108 then verifies that the JRID in the job record matches the JRID from the encrypted data package 110; its own DPID matches the DPID from the encrypted data package; and Exp is not in the past. If the verification fails, the data processor 108 scrubs the clear DPrivKP from its memory and abandons the job.

Otherwise, in step 4, the data processor 108 retrieves the delivery private key protected by its password ([DPrivK]$_{DPrivKP}$) from the persistent storage 104 where it is stored. In step 5, the data processor 108 retrieves the data files 110 referenced in JInfo of the job record and encrypted by DPubK.

In step 6, the data processor 108 decrypts the data files 110 using DPrivK with DPrivKP, saves the clear data files in a persistent storage 104, and immediately scrubs the clear DPrivKP from its memory. At this point, the clear data files are ready to be processed.

Key and Password Protection

Figure 7:
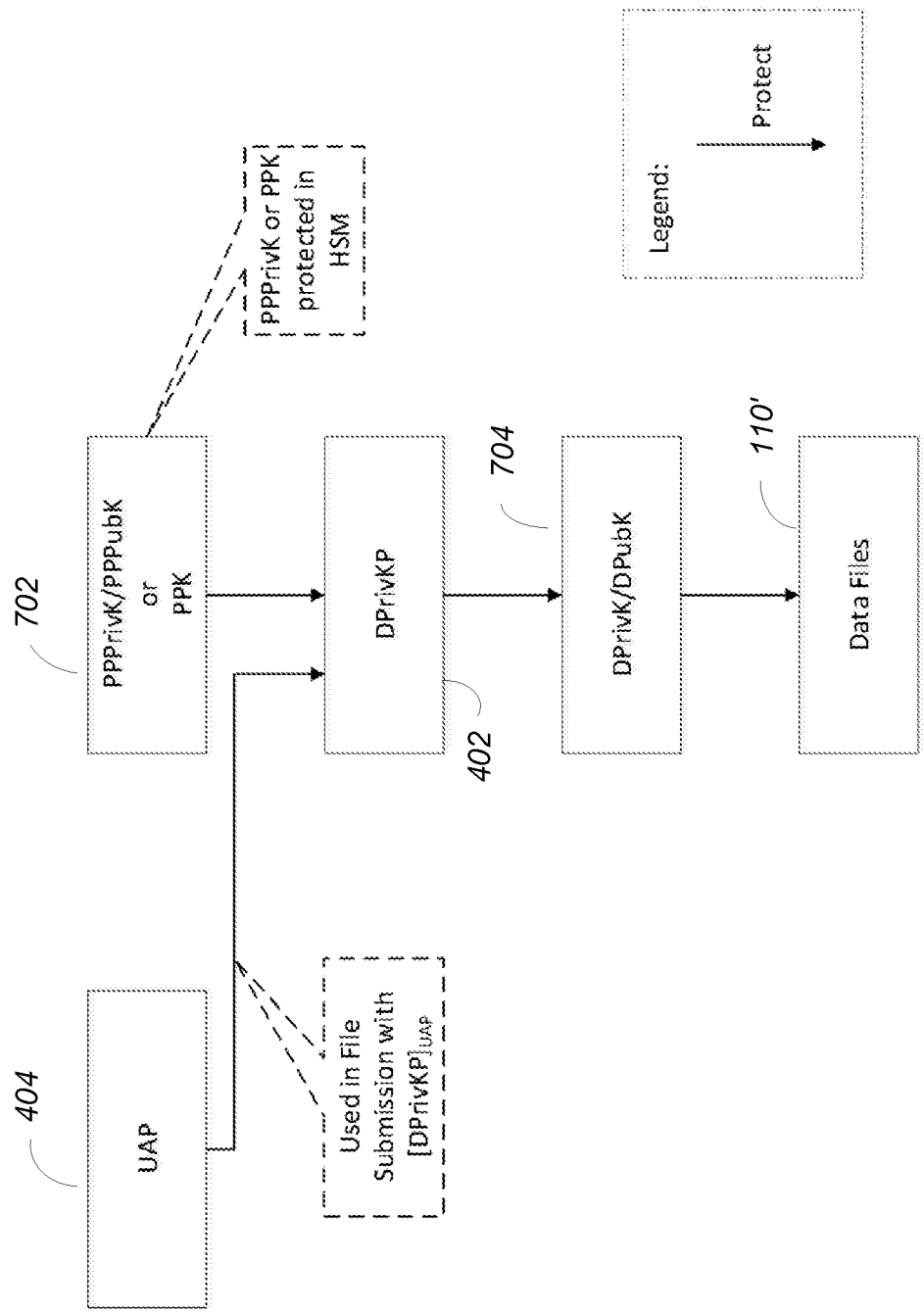
FIG. 7 is a diagram summarizing relations between the keys and passwords used in the illustrated system and method.

FIG. 7 is a diagram summarizing relations between the keys and passwords used in the illustrated system and method. An arrow from entity A to entity B means A is used to protect (encrypt/decrypt/secure) B. Note that the unencrypted data files 110' are protected by the delivery key pair 704 including the delivery private key [DPrivK] and the delivery public key [DPubK]. The delivery key pair 704 is protected by the delivery private key password [DPrivKP] 402, and the delivery private key password [DPrivKP] 402 is protected by the password protection key 702 (which can either be an asymmetric key pair (PPPrivK and PPPubK) or a symmetric password protection key PPK). Note also that the password protection private key [PPPrivK] and [PPK] are protected by secure storage in the HSM 106, and that the UAP 404 is also used to protect the delivery private key password [DprivKP] 402 in some embodiments.

Hardware Environment

Figure 8:
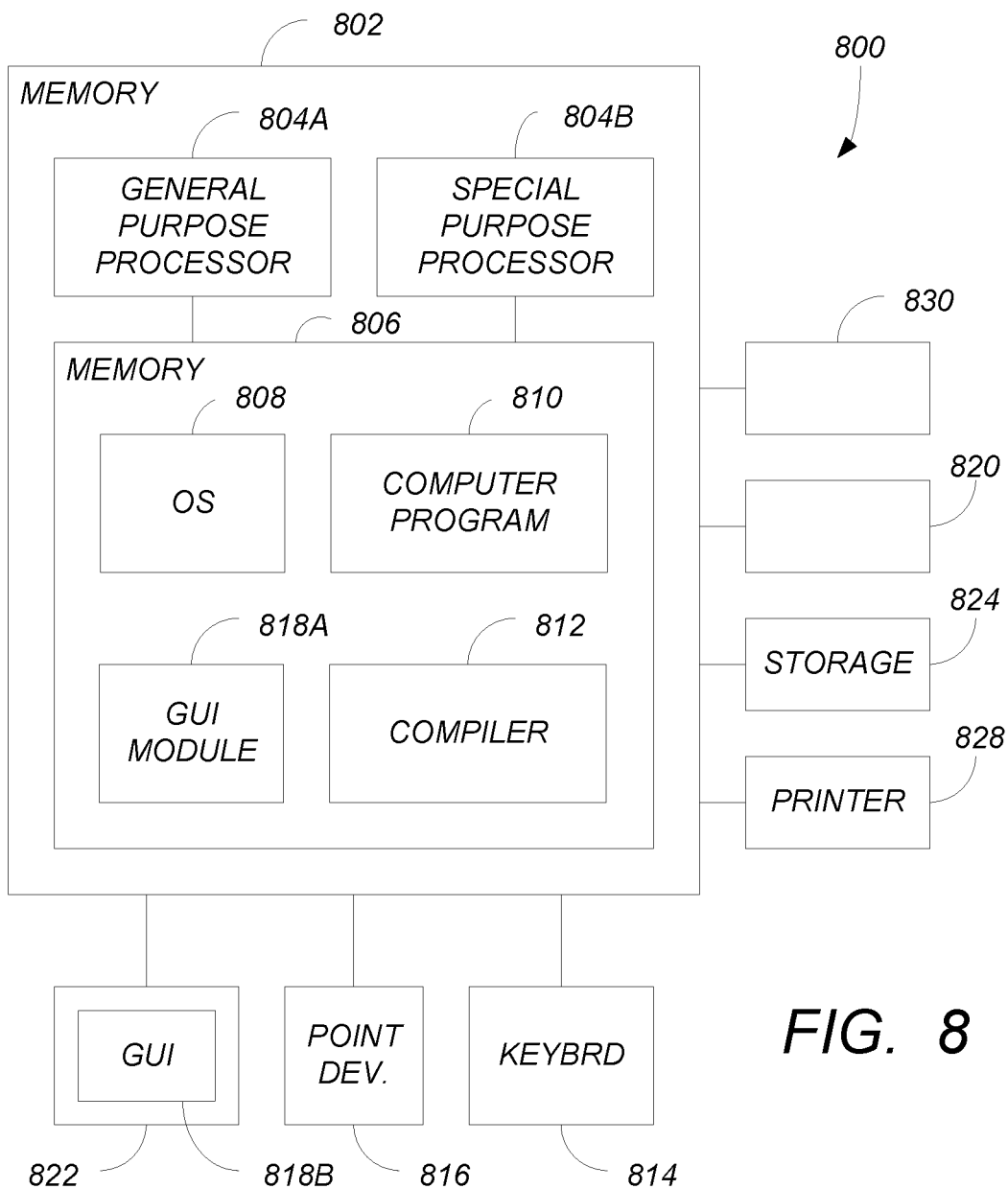
FIG. 8 illustrates an exemplary computer system 800 that could be used to implement processing elements.

FIG. 8 illustrates an exemplary computer system 800 that could be used to implement processing elements of the above disclosure, including the system manager 102, the data processor 108, persistent storage 104 and/or the HSM 106. The computer 802 comprises a processor 804 and a memory, such as random access memory (RAM) 806. The computer 802 is operatively coupled to a display 822, which presents images such as windows to the user on a graphical user interface 818B. The computer 802 may be coupled to other devices, such as a keyboard 814, a mouse device 816, a printer 828, etc. Of course, those skilled in the art will recognize that any combination of the above components, or any number of different components, peripherals, and other devices, may be used with the computer 802.

Generally, the computer 802 operates under control of an operating system 808 stored in the memory 806, and interfaces with the user to accept inputs and commands and to present results through a graphical user interface (GUI) module 818A. Although the GUI module 818B is depicted as a separate module, the instructions performing the GUI functions can be resident or distributed in the operating system 808, the computer program 810, or implemented with special purpose memory and processors. The computer 802 also implements a compiler 812 which allows an application program 810 written in a programming language such as COBOL, C++, FORTRAN, or other language to be translated into processor 804 readable code. After completion, the application 810 accesses and manipulates data stored in the memory 806 of the computer 802 using the relationships and logic that was generated using the compiler 812. The computer 802 also optionally comprises an external communication device such as a modem, satellite link, Ethernet card, or other device for communicating with other computers.

In one embodiment, instructions implementing the operating system 808, the computer program 810, and the compiler 812 are tangibly embodied in a computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of instructions which, when read and executed by the computer 802, causes the computer 802 to perform the operations herein described. Computer program 810 and/or operating instructions may also be tangibly embodied in memory 806 and/or data communications devices 830, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

What is claimed is:

1. A method of deferring decryption and processing of an encrypted file in a device with a data processor, the method comprising:
   (a) receiving the encrypted file, the file encrypted according to a delivery public key [DPubK] of a delivery key pair and a password [DPrivKP] of a delivery private key, the delivery key pair comprising the delivery public key and the delivery private key [DPrivK];
   (b) storing the file encrypted according to the delivery public key [File]DPubK in persistent storage;
   (c) receiving the password of the delivery private key [DPrivKP];
   (d) generating a data package comprising the password of the delivery private key [DPrivKP];
   (e) encrypting the data package according to a password protection key; and
   (f) storing the encrypted data package and data processing job information [Jinfo] referencing the encrypted file $[File]_{DPubK}$ as a job record in persistent storage.

2. The method of claim 1, wherein:
   the generated data package further comprises a system-wide unique job reference [JRID], an identifier of the data processor [DPID] and an expiration time stamp [Exp]; and
   the stored record further comprises the system wide unique job reference [JRID].

3. The method of claim 1, further comprising:
   verifying the password of the delivery private key [DPrivKP] after receiving the password and before generating the data package, comprising:
   generating random data [RD];
   encrypt random data according to the delivery public key [DPubK];
   decrypting the encrypted random data according to the delivery private key [DPrivK] and the password of the delivery private key [DPrivKP] to produce derived random data [RD']; and
   verifying the password of the delivery private key [DPrivKP] only if the random data [RD] equals the derived random data [RD'].

4. The method of claim 1, wherein the password of the delivery private key is encrypted [DPrivKP] according to a user account password [UAP] and stored in persistent storage, the encrypted password of the delivery private key $[DPrivKP]_{UAP}$ stored as a part of an account of a user and separate from accounts of other users.

5. The method of claim 4, further comprising:
   receiving the user account password [UAP] from a user;
   retrieving the password of the delivery private key encrypted by the user account password $[DPrivKP]_{UAP}$ from persistent storage; and
   decrypting encrypted password of the delivery private key [DPrivKP] according to the UAP to produce the password of the delivery private key [DPrivKP].

6. The method of claim 1, wherein receiving the password of the delivery private key [DPrivKP] comprises receiving the password of the delivery private key [DPrivKP] from an operator of the system.

7. The method of claim 1, wherein:
   encrypting the data package according to the password protection key comprises:
      encrypting the data package according to a password protection public key [PPPubK] of the data processor; and
   the method further comprises deleting the password from a system manager memory.

8. The method of claim 1, wherein:
   the password protection key is a symmetric password protection key [PPK] securely stored in a hardware security module [HSM]; and
   encrypting the data package according to a key comprises:
      encrypting the data package in the hardware security module [HSM] according to the password protection key [PPK].

9. The method of claim 1, further comprising:
   (g) retrieving the encrypted data package from persistent storage referenced by the data processing job information [Jinfo];
   (h) decrypting the encrypted data package to retrieve the password associated with the delivery private key [DPrivKP];
   (i) retrieving, the delivery private key protected by the password associated with the delivery private key $[DPrivK]_{DPrivKP}$ from persistent storage;
   (j) recovering the delivery private key using the password associated with the delivery private key [DPrivKP];
   (k) retrieving the file encrypted according to the delivery public key $[File]_{DPubK}$ from persistent storage; and
   (l) decrypting the file encrypted according to the delivery public key $[File]_{DPubK}$ using the delivery private key.

10. The method of claim 9, wherein:
    the generated data package further comprises a system-wide unique job reference [JRID], an identifier of the data processor [DPID] and an expiration time stamp [Exp];
    the stored record further comprises the system wide unique job reference [JRID];
    decrypting the encrypted data package further retrieves the system wide unique job reference [JRID], the identifier of the data processor [DPID] and the expiration time stamp [Exp] and the password associated with the delivery private key [DPrivKP]; and
    performing steps (h)-(l) only if the system wide unique job reference [JRID] matches the system wide unique job reference [JRID] of the job record, the identifier of the data processor [DPID] matches an identifier of the data processor, and the expiration time stamp [Exp] is not in the past, otherwise scrubbing the password associated with the delivery private key [DPrivKP] and terminating processing.

11. The method of claim 9, wherein:
    encrypting the data package according to a password protection key comprises:
       encrypting the data package according to a password protection public key [PPPubK] of the data processor; and
    decrypting the encrypted data package to retrieve the password associated with the delivery private key [DPrivKP] comprises:
       decrypting the encrypted data package in a hardware security module [HSM] using a password protection private key [PPPrivK] securely stored in the hardware security module [HSM].

12. The method of claim 9, wherein:
    the password protection key is a symmetric password protection key [PPK] securely stored in a hardware security module [HSM]; and
    encrypting the data package according to the password protection key comprises:

encrypting the data package in the hardware security module [HSM] according to the password protection key [PPK];

decrypting the encrypted data package to retrieve the password associated with the delivery private key [DPrivKP] comprises:

decrypting the encrypted data package in the hardware security module [HSM] using the password protection key [PKK] securely stored in the hardware security module [HSM].

13. An apparatus for deferring decryption and processing of an encrypted file, comprising:

a first processor;

a first memory, communicatively coupled to the first processor, the first memory storing first processor instructions including first processor instructions for:

(a) receiving the encrypted file, the file encrypted according to a delivery public key [DPubK] of a delivery key pair and a password [DPrivKP] of a delivery private key, the delivery key pair comprising the delivery public key and the delivery private key [DPrivK];

(b) storing the file encrypted according to the delivery public key [File].sub.DPubK in persistent storage;

(c) receiving the password of the delivery private key [DPrivKP]; (d) generating a data package comprising the password of the delivery private key [DPrivKP];

(e) encrypting the data package according to a password protection key; and (f) storing the encrypted data package and data processing job information [Jinfo] referencing the encrypted file $[File]_{DPubK}$ as a job record in persistent storage.

14. The apparatus of claim 13, wherein:

the generated data package further comprises a system-wide unique job reference [JRID], an identifier of a second processor processing the file [DPID] and an expiration time stamp [Exp]; and the stored record further comprises the system wide unique job reference [JRID].

15. The apparatus of claim 13, wherein the first processor instructions further comprise first processor instructions for:

verifying the password of the delivery private key [DPrivKP] after receiving the password and before generating the data package, comprising first processor instructions for:

generating random data [RD];

encrypt random data according to the delivery public key [DPubK];

decrypting the encrypted random data according to the delivery private key [DPrivK] and the password of the delivery private key [DPrivKP] to produce derived random data [RD']; and verifying the password of the delivery private key [DPrivKP] only if the random data [RD] equals the derived random data [RD'].

16. The apparatus of claim 13, wherein the password of the delivery private key is encrypted [DPrivKP] according to a user account password [UAP] and stored in persistent storage, the encrypted password of the delivery private key $[DPrivKP]_{UAP}$ stored as a part of an account of a user and separate from accounts of other users.

17. The apparatus of claim 16, wherein the first processor instructions further comprise first processor instructions for:

receiving the user account password [UAP] from a user;

retrieving the password of the delivery private key encrypted by the user account password $[DPrivKP]_{UAP}$ from persistent storage; and decrypting encrypted password of the delivery private key [DPrivKP] according to the UAP to produce the password of the delivery private key [DPrivKP].

18. The apparatus of claim 13, wherein the first processor instructions for receiving the password of the delivery private key [DPrivKP] comprises first processor instructions for receiving the password of the delivery private key [DPrivKP] from an operator of the first processor.

19. The apparatus of claim 13, wherein:

the first processor instructions for encrypting the data package according to the password protection key comprise first processor instructions for:

encrypting the data package according to a password protection public key [PPPubK] of a second processor; and the first processor instructions further comprise first processor instructions for deleting the password from a system manager memory.

20. The apparatus of claim 13, further comprising:

a second processor communicatively coupled to a second memory storing second processor instructions comprising second processor instructions for:

(g) retrieving the encrypted data package from persistent storage referenced by the data processing job information [Jinfo];

(h) decrypting the encrypted data package to retrieve the password associated with the delivery private key [DPrivKP];

(i) retrieving, the delivery private key protected by the password associated with the delivery private key $[DPrivK]_{DPrivKP}$ from persistent storage;

(j) recovering the delivery private key using the password associated with the delivery private key [DPrivKP];

(k) retrieving the file encrypted according to the delivery public key $[File]_{DPubK}$ from persistent storage; and (l) decrypting the file encrypted according to the delivery public key $[File]_{DPubK}$ using the delivery private key.

* * * * *